United States Patent
Kudo (10) Patent No.: US 11,269,235 B2
(45) Date of Patent: Mar. 8, 2022

(54) OPTICAL MODULE AND ELECTRONIC APPARATUS

(71) Applicant: SEIKO EPSON CORPORATION, Tokyo (JP)

(72) Inventor: Kei Kudo, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 128 days.

(21) Appl. No.: 16/716,718

(22) Filed: Dec. 17, 2019

(65) Prior Publication Data

US 2020/0192178 A1 Jun. 18, 2020

(30) Foreign Application Priority Data

Dec. 18, 2018 (JP) .............................. JP2018-236086

(51) Int. Cl.
*G02F 1/21* (2006.01)
*G01J 3/12* (2006.01)

(52) U.S. Cl.
CPC .................. *G02F 1/21* (2013.01); *G01J 3/12* (2013.01); *G01J 2003/1247* (2013.01); *G02F 1/213* (2021.01)

(58) Field of Classification Search
CPC ........ G02B 26/00; G02B 26/001; G02B 5/20; G02B 5/28; G02B 5/285; G02B 5/284; G02B 26/0841; G02F 1/21; G02F 1/213; G02F 1/03; G02F 1/07; G01J 3/12; G01J 3/28; G01J 3/2823; G01J 3/26; G01J 1/0271; G01J 1/0488; G01J 1/0214; G01J 2003/2826; G01J 2003/1247
USPC ......... 359/578, 579, 589, 223.1, 224.1, 260, 359/290, 291; 356/450, 454, 519, 506
See application file for complete search history.

(56) References Cited

U.S. PATENT DOCUMENTS

| | | | | |
|---|---|---|---|---|
| 2007/0171531 A1* | 7/2007 | Nakamura | ........... | G02B 26/001 359/580 |
| 2014/0268344 A1* | 9/2014 | Arakawa | ................... | G01J 3/26 359/580 |
| 2015/0241270 A1 | 8/2015 | Matsuno et al. | | |
| 2016/0187197 A1* | 6/2016 | Hirokubo | ................. | G01J 3/12 250/206 |
| 2019/0063989 A1 | 2/2019 | Asauchi | | |

FOREIGN PATENT DOCUMENTS

| | | |
|---|---|---|
| JP | 2015-161511 A | 9/2015 |
| JP | 2019-039738 A | 3/2019 |

* cited by examiner

*Primary Examiner* — Jie Lei
(74) *Attorney, Agent, or Firm* — Oliff PLC (57) ABSTRACT

An optical module 100 includes a first substrate 11 including an optical filter device 7 having a wavelength variable interference filter 110 built therein, a second substrate 12 including a light receiving element 17, and a first supporter 16 that mechanically or electrically joins the first substrate 11 and the second substrate 12 to each other, in which the wavelength variable interference filter 110 and the light receiving element 17 are disposed to face each other by the first supporter 16, and the first substrate 11 and the second substrate 12 are joined to each other by the first supporter 16 with a gap S1 in which a circuit element 21 is mountable.

5 Claims, 7 Drawing Sheets

OPTICAL MODULE AND ELECTRONIC APPARATUS

The present application is based on, and claims priority from JP Application Serial Number 2018-236086, filed Dec. 18, 2018, the disclosure of which is hereby incorporated by reference herein in its entirety.

BACKGROUND

1. Technical Field

The present disclosure relates to an optical module and an electronic apparatus including the optical module.

2. Related Art

In the related art, an optical module including an optical filter, a light receiving element, and a circuit substrate that drives the optical filter and the light receiving element is known. In JP-A-2015-161511, an optical filter device including a wavelength variable interference filter (Fabry-Perot etalon) that can adjust a spectrum peak to a certain wavelength is used as an optical filter. JP-A-2015-161511 discloses a configuration in which the optical filter device is fixed to cover a recessed portion of a circuit substrate including the recessed portion and a planar portion, and a light receiving element is housed in the recessed portion. Further, JP-A-2015-161511 discloses a configuration in which the optical filter device is fixed to one planar portion of the circuit substrate so as to cover a through hole portion of the circuit substrate including the through hole portion and the planar portions, and a light receiving substrate on which the light receiving element is fixed is fixed to the other planar portion of the circuit substrate so as to face the optical filter device and cover the through hole portion.

However, the configuration described in JP-A-2015-161511 is a configuration in which the circuit substrate spreads in a plane in a direction orthogonal to an optical axis of light incident on a wavelength variable interference filter. Depending on requirements of an apparatus on which the optical module is mounted, there is a problem that it is difficult to reduce a circuit area while a structure with a reduced planar size is required.

SUMMARY

An optical module according to an aspect of the present disclosure includes a first substrate including an optical filter device having a wavelength variable interference filter built therein, a second substrate including a light receiving element, and a first support portion that mechanically or electrically joins the first substrate and the second substrate to each other, in which the wavelength variable interference filter and the light receiving element are disposed to face each other by the first support portion, and the first substrate and the second substrate are joined to each other by the first support portion with a gap in which a circuit element is mountable.

The optical module may further include a third substrate, and a second support portion that mechanically or electrically joins the second substrate and the third substrate to each other, in which the second substrate and the third substrate are joined to each other by the second support portion with a gap in which a circuit element is mountable.

The second substrate may include a capacitance voltage conversion circuit in the optical module.

An electronic apparatus according to another aspect of the present disclosure includes the optical module described above, and a control unit that controls the optical module.

DESCRIPTION OF EXEMPLARY EMBODIMENTS

Hereinafter, embodiments of the present disclosure will be described with reference to the drawings. In the following drawings, each member is illustrated in a recognizable size, and thus, a scale of each member is different from an actual scale.

First Embodiment

Figure 1:
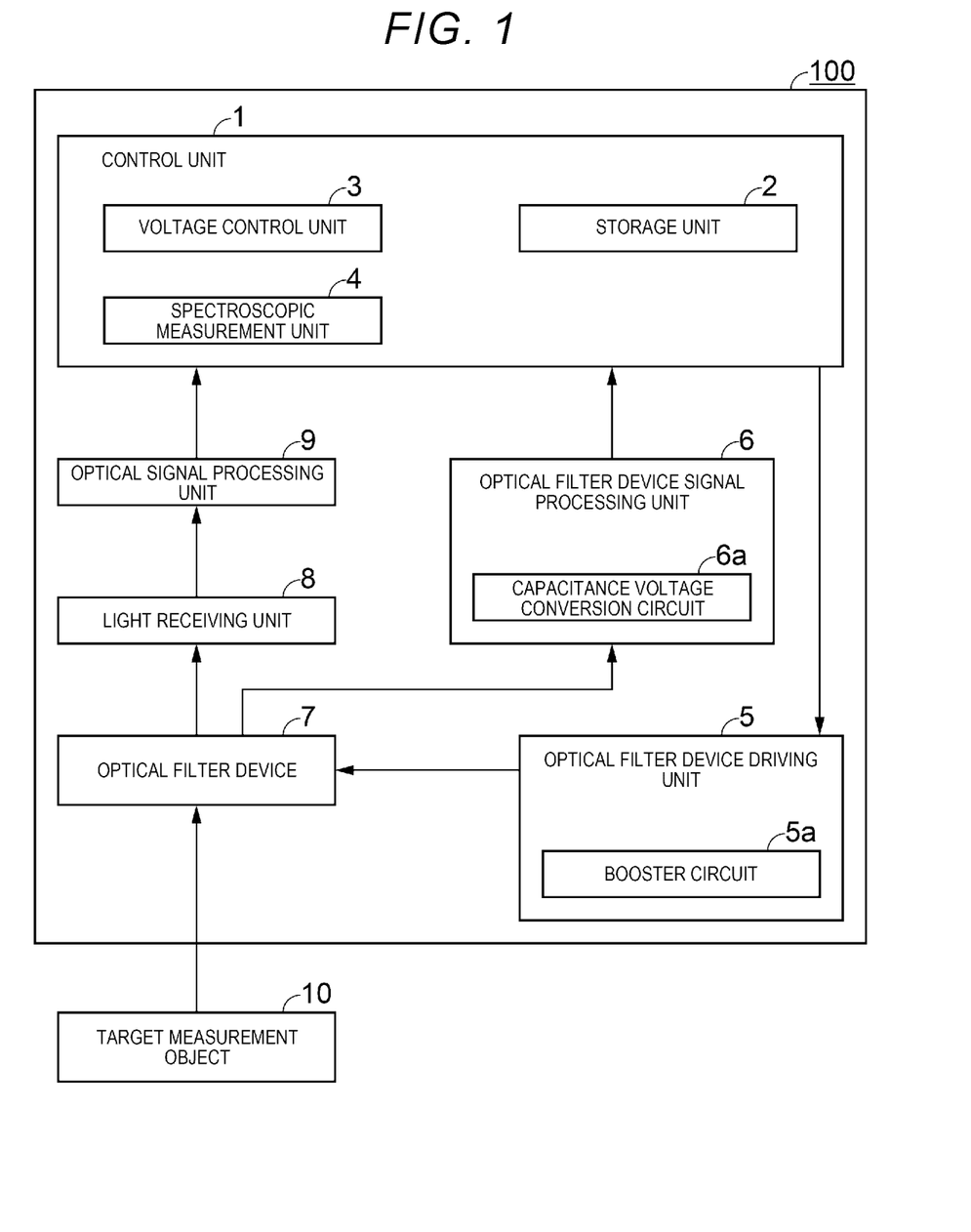
FIG. 1 is a block diagram illustrating a configuration of an optical module according to a first embodiment.

FIG. 1 is a block diagram illustrating a configuration of an optical module 100 according to a first embodiment.

First, the configuration of the optical module 100 according to the present embodiment will be described.

As illustrated in FIG. 1, the optical module 100 includes a control unit 1, an optical filter device driving unit 5, an optical filter device signal processing unit 6, an optical filter device 7, a light receiving unit 8, an optical signal processing unit 9, and the like. Further, the control unit 1 includes a storage unit 2, a voltage control unit 3, a spectroscopic measurement unit 4, and the like.

The storage unit 2 stores a voltage value necessary for setting the optical filter device 7 to a certain wavelength, and also stores a correction value for deviation due to a specific factor such as temperature.

The optical filter device driving unit 5 drives the optical filter device 7 in response to a signal from the voltage control unit 3. The optical filter device 7 includes, for example, a variable capacitor whose value changes depending on a driving condition therein, and the driving condition is read by the optical filter device signal processing unit 6. A driving state read by the optical filter device signal processing unit 6 is compared with a voltage value stored in the storage unit 2 by the voltage control unit 3, and a difference therebetween is fed back to the optical filter device driving unit 5.

The optical filter device 7 selectively transmits a certain wavelength of light from a target measurement object 10. The light transmitted through the optical filter device 7 is received by the light receiving unit 8, converted into a voltage by the optical signal processing unit 9, and held in the spectroscopic measurement unit 4. A spectrum of the target measurement object 10 can be measured by scanning a wavelength of the optical filter device 7 and repeatedly receiving the light.

Figure 2:
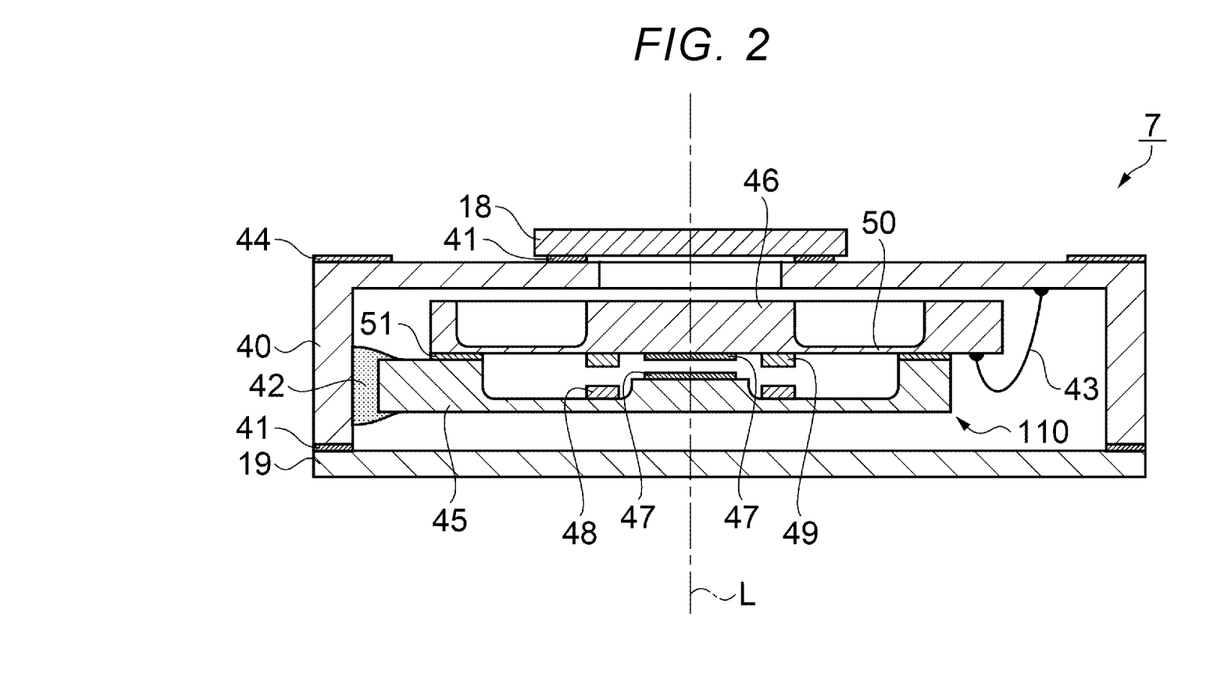
FIG. 2 is a sectional diagram illustrating a schematic configuration of an optical filter device.

FIG. 2 is a sectional diagram illustrating a schematic configuration of the optical filter device 7.

The optical filter device 7 includes a wavelength variable interference filter 110 and a housing 40. The wavelength variable interference filter 110 is built in an exterior formed by a first glass member 18, a second glass member 19, and the housing 40.

The housing 40 and the first glass member 18, and the housing 40 and the second glass member 19 are joined by a joining member 41. For example, low-melting glass, epoxy resin, or the like is used as the joining member 41. The wavelength variable interference filter 110 and the housing 40 are fixed by a fixing material 42 such as an adhesive. At this time, in order to prevent a stress of the fixing material from being transmitted to the wavelength variable interference filter 110, the wavelength variable interference filter 110 and the housing 40 are preferably fixed at one point. An electrode 44 on an outer surface of the housing 40 and the wavelength variable interference filter 110 are electrically coupled to each other by a bonding wire 43 and a wire in the housing 40.

The wavelength variable interference filter 110 includes a base substrate 45 and a diaphragm substrate 46 and is joined by a joining film 51. A mirror 47 is formed on each of the base substrate 45 and the diaphragm substrate 46. An outermost surface of each of the mirrors 47 facing each other is formed of a conductor. A capacitance between the mirrors 47 facing each other is read by the optical filter device signal processing unit 6. Further, a distance between the mirrors 47 facing each other is controlled by an electrostatic actuator configured by a fixed electrode 48 and a movable electrode 49, which are formed concentrically, facing each other.

When a voltage is applied between the fixed electrode 48 and the movable electrode 49 facing each other, a force that attracts the fixed electrode 48 and the movable electrode 49 is generated by an electrostatic force. At this time, a diaphragm portion 50 formed concentrically deforms, and thereby, the mirror 47 of the diaphragm substrate 46 is drawn toward the base substrate 45, and the distance between the mirrors 47 facing each other is controlled. Then, a wavelength of light that passes through the wavelength variable interference filter 110 is selected depending on the distance between the mirrors 47 facing each other.

At the time of spectroscopic measurement, light from the target measurement object 10 is incident on the optical filter device 7 along an optical axis L from the second glass member 19 side. Then the light incident on the optical filter device 7 interferes between the facing mirrors 47, and light of the wavelength selected depending on the distance between the facing mirrors 47 passes through the wavelength variable interference filter 110. The light that passes through the wavelength variable interference filter 110 passes through the first glass member 18 and is emitted from the optical filter device 7.

Figure 3:
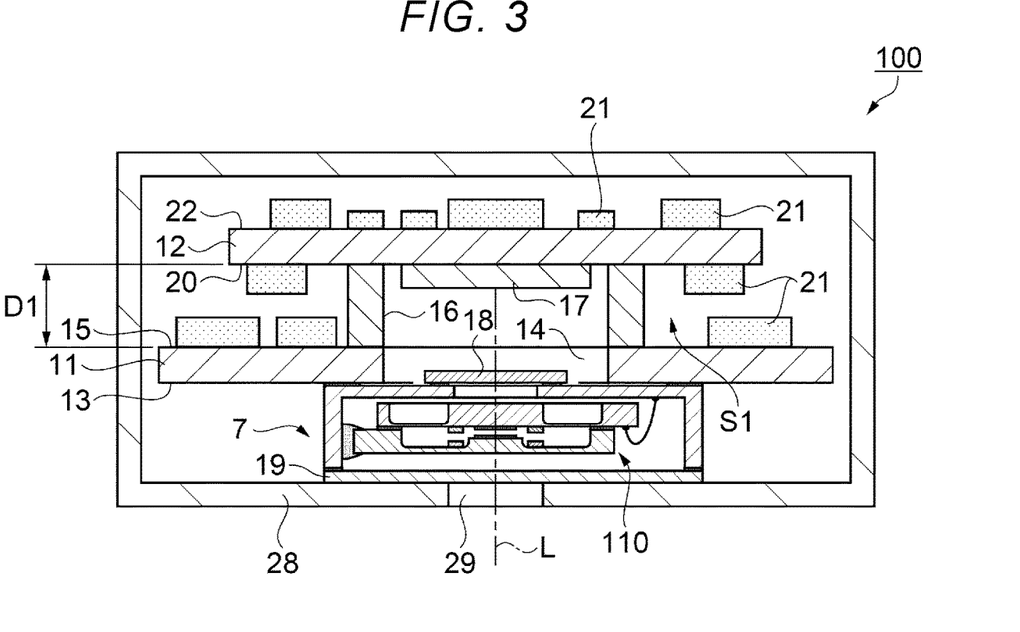
FIG. 3 is a sectional diagram illustrating a schematic configuration of the optical module.
Figure 4:
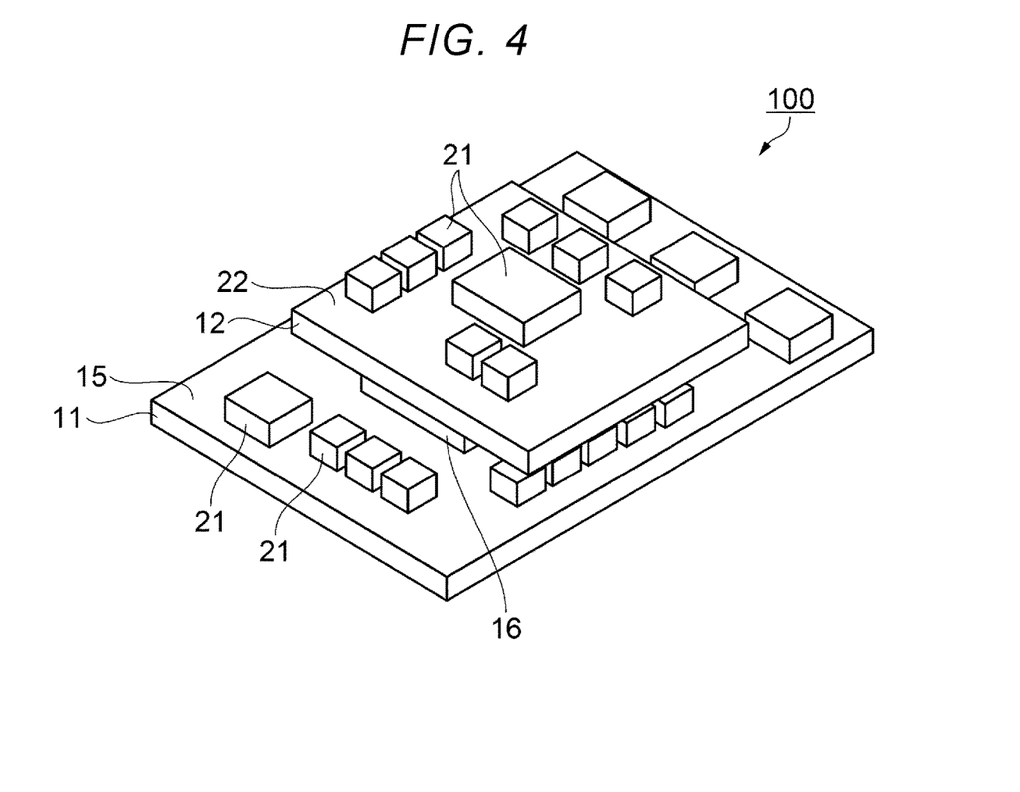
FIG. 4 is a perspective diagram illustrating a schematic configuration of the optical module.
Figure 5:
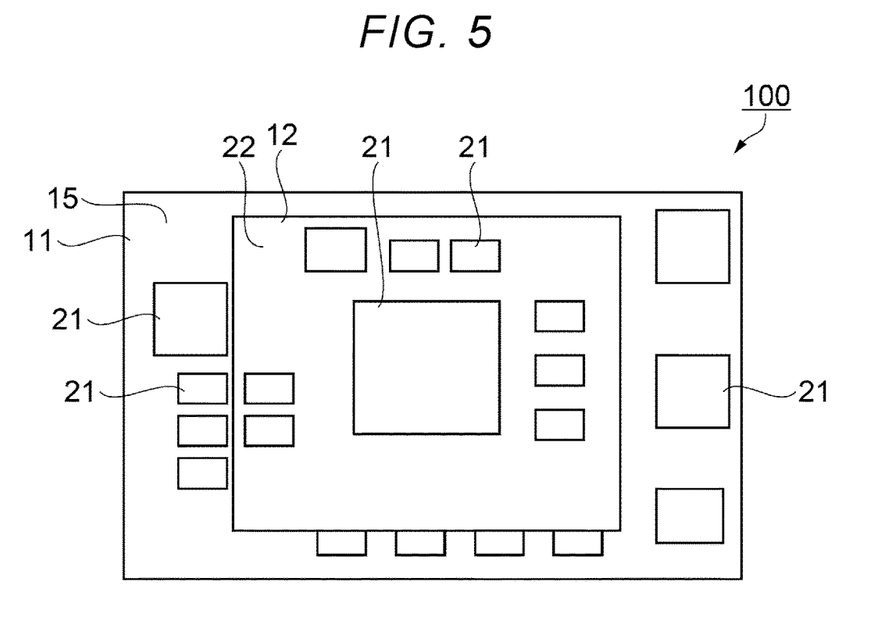
FIG. 5 is a plan diagram illustrating a schematic configuration of the optical module.

FIG. 3 is a sectional diagram illustrating a schematic configuration of the optical module 100. FIG. 4 is a perspective diagram illustrating the schematic configuration of the optical module 100. FIG. 5 is a plan diagram illustrating the schematic configuration of the optical module 100. In FIGS. 4 and 5, a housing 28 of the optical module 100 is not illustrated.

As illustrated in FIGS. 3 to 5, the optical module 100 of the present embodiment includes the optical filter device 7, a first substrate 11, a second substrate 12, a first support portion 16, the housing 28 that houses these configuration members, and the like. Among surface portions on both sides of the first substrate 11, one surface portion is referred to as a first planar portion 13 and the other surface portion is referred to as a second planar portion 15. Further, among surface portions on both sides of the second substrate 12, one surface portion is referred to as a third planar portion 20 and the other surface portion is referred to as a fourth planar portion 22. The second planar portion 15 of the first substrate 11 and the third planar portion 20 of the second substrate 12 face each other.

In the present embodiment, a through hole portion 14 is formed in the first substrate 11 in a normal direction of the first planar portion 13, and the optical filter device 7 is mounted on the first planar portion 13 so as to cover the through hole portion 14. At this time, the first glass member 18 of the optical filter device 7 is located in the through hole portion 14 of the first substrate 11.

The second substrate 12 is joined to the second planar portion 15 on an opposite side of the first planar portion 13 via the first support portion 16. At this time, it is desirable that the first substrate 11 and the second substrate 12 be electrically joined to each other in at least one location of the first support portion 16. When the first substrate 11 and the second substrate 12 are mechanically joined and not electrically joined, the first substrate and the second substrate may be electrically joined to each other by using a conductive material such as a bonding wire or a flexible flat cable (FFC).

A light receiving element 17 is mounted on the second substrate 12. The light receiving element 17 and the first glass member 18 are disposed to face each other in the through hole portion 14 via the first support portion 16.

At the time of spectroscopic measurement, light from the target measurement object 10 is incident on the optical module 100 along the optical axis L from an opening 29 provided in the housing 28 of the optical module 100. Then, the light incident on the optical module 100 passes through the second glass member 19, the wavelength variable interference filter 110, and the first glass member 18 and is incident on the light receiving element 17.

As illustrated in FIG. 3, in the present embodiment, the first support portion 16 has a gap S1 between the first substrate 11 and the second substrate 12. A distance in a height direction (direction parallel to the optical axis L) of the gap S1 is determined by a thickness D1 of the first support portion 16. By making the thickness D1 of the first support portion 16 larger than thicknesses of circuit elements 21 mounted on the first substrate 11 and the second substrate 12, the circuit elements 21 can be mounted on each of the second planar portion 15 and the third planar portions 20 as illustrated in FIGS. 3 to 5.

A circuit configuring the optical module 100 includes a circuit that easily generates an electrical noise and a circuit that is susceptible to the electrical noise. For example, as illustrated in FIG. 1, a booster circuit 5a included in the optical filter device driving unit 5 is a circuit that boosts a power supply voltage supplied to the optical module 100 to a voltage that can drive the wavelength variable interference filter 110. Further, for example, as illustrated in FIG. 1, a capacitance voltage conversion circuit 6a included in the optical filter device signal processing unit 6 is a circuit that converts a capacitance of the optical filter device 7 into a voltage and is susceptible to the electrical noise.

In the related art, the optical module 100 is configured on a single substrate, and the booster circuit 5a and the capacitance voltage conversion circuit 6a are mounted on the single substrate. Accordingly, the noise is easily applied to the capacitance voltage conversion circuit 6a by operating the booster circuit 5a.

However, in the present embodiment, the first substrate 11 is provided with a circuit that easily generates the electrical noise, such as the booster circuit 5a. The second substrate 12 is provided with a circuit that is susceptible to the electrical noise, such as the capacitance voltage conversion circuit 6a. With this configuration, the optical module 100 is less affected by a noise.

By reducing influence of the noise of the capacitance voltage conversion circuit 6a, the optical filter device signal processing unit 6 can acquire the capacitance of the optical filter device 7 with a higher accuracy. Further, as the accuracy of acquiring the capacitance of the optical filter device 7 is increased, an accuracy of a wavelength control of the light passing through the wavelength variable interference filter 110 is increased. Accordingly, a spectrum of the target measurement object 10 can be measured more accurately.

Here, a configuration of an optical module 100C of related art will be briefly described.

Figure 8:
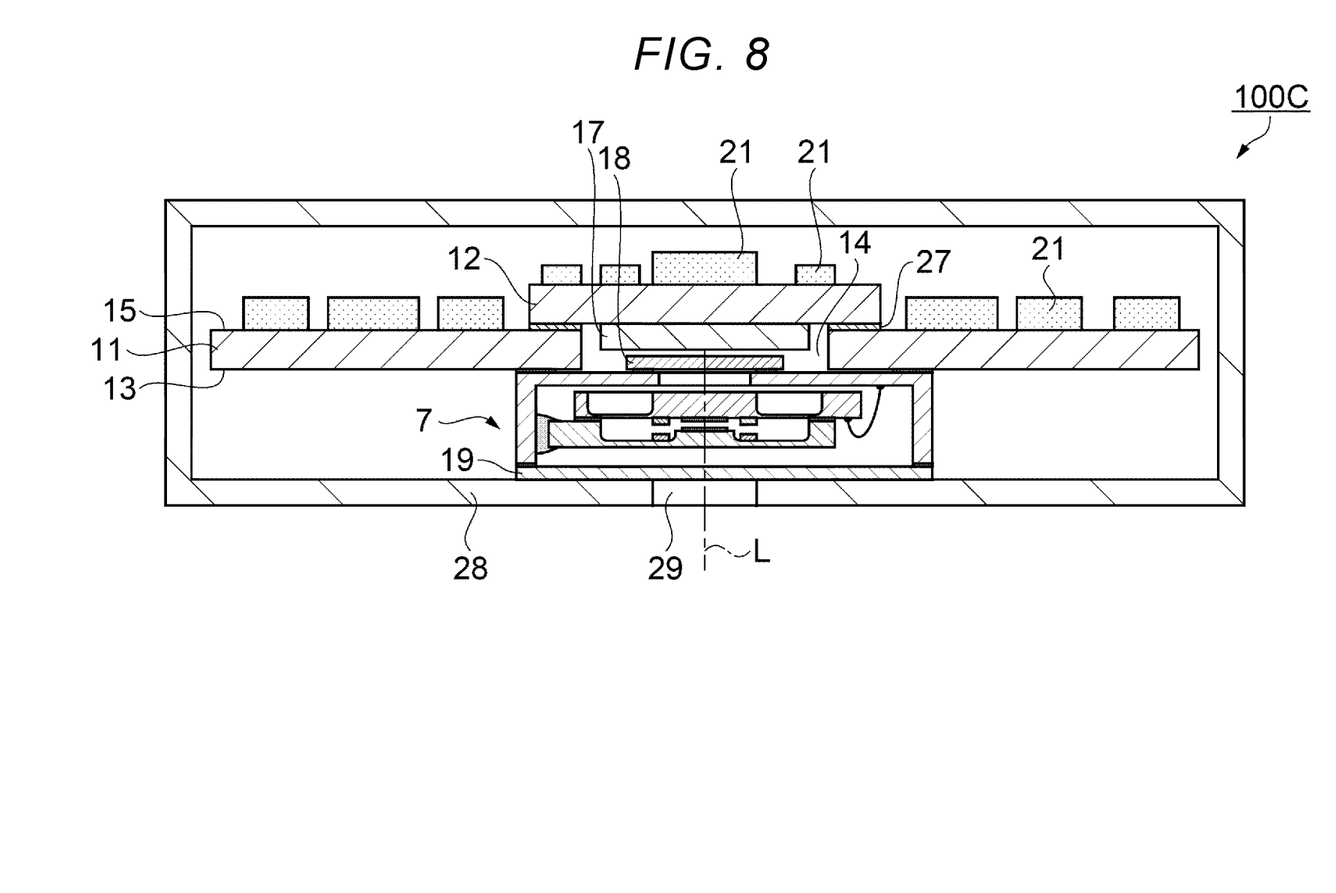
FIG. 8 is a sectional diagram illustrating a schematic configuration of an optical module of related art.
Figure 9:
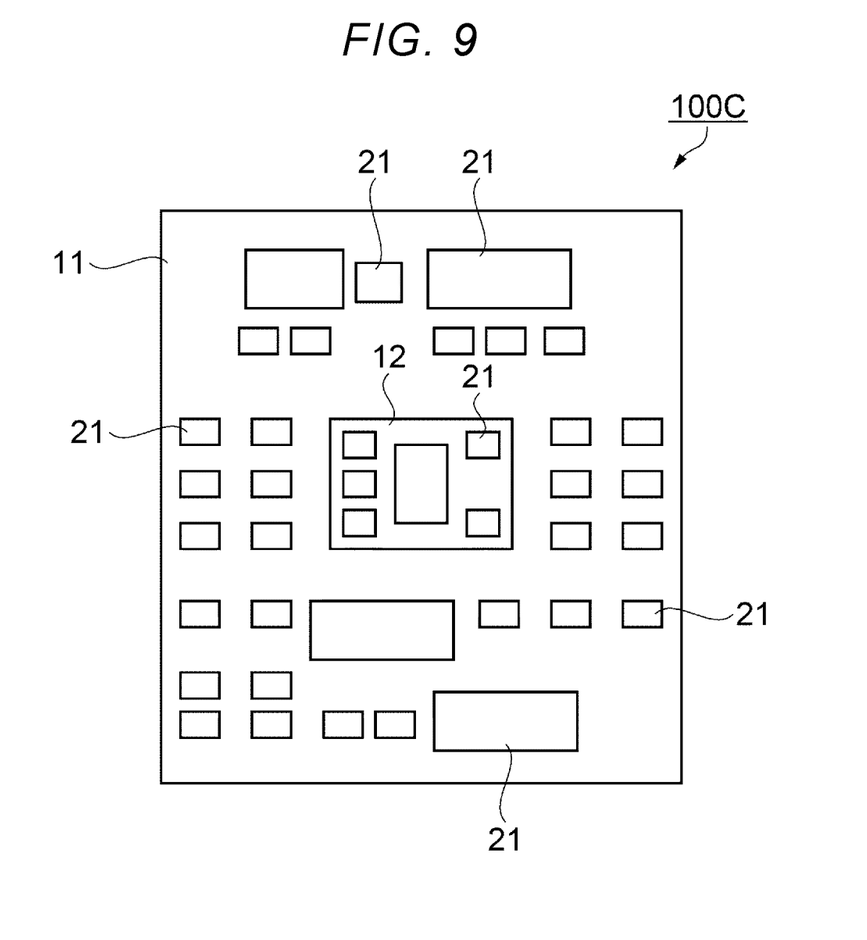
FIG. 9 is a plan diagram illustrating a schematic configuration of the optical module of the related art.

FIG. 8 is a sectional diagram illustrating a schematic configuration of the optical module 100C of the related art. FIG. 9 is a planar diagram illustrating the schematic configuration of the optical module 100C of the related art. Further, FIG. 9 is not illustrated the housing 28 of the optical module 100C. In FIGS. 8 and 9, the same reference numerals are attached to members corresponding to the present embodiment.

In the optical module 100C of the related art, the first substrate 11 and the second substrate 12 are joined to each other by a joining member 27 such as solder. In this configuration, even though a planar size of the second substrate 12 is increased, only an area where the first substrate 11 and the second substrate 12 overlap each other is increased, and an area where the circuit element 21 is mountable is not increased. Therefore, in the related art, the second substrate 12 may be set to a minimum size that can ensure a joining area, a small number of the circuit elements 21 were mounted on the second substrate 12, and all the remaining circuit elements 21 were mounted on the first substrate 11. As such, in the related art, mounting all the remaining circuit elements 21 on the first substrate 11 was a cause of increasing a planar size of the first substrate 11.

In contrast to this, a planar size of the first substrate 11 can be reduced by the configuration of the optical module 100 according to the present embodiment as compared with the first substrate 11 of the related art. A depth size of the optical module 100 is larger than a depth size of the optical module 100C of the related art.

Here, the planar size refers to a size of a plane orthogonal to the optical axis L of the light incident on the optical module 100. Further, the depth size refers to a distance (thickness) in a direction parallel to the optical axis L of light incident on the optical module 100.

As described above, according to the optical module 100 of the present embodiment, the following effects can be obtained.

According to the optical module 100 of the present embodiment, the optical filter device 7 (wavelength variable interference filter 110) and the light receiving element 17 are disposed to face each other by the first support portion 16 and the first substrate 11, and thereby, the light receiving element 17 can reliably receive the light emitted from the optical filter device 7.

In the related art, the circuit element 21 is not mounted between the first substrate 11 and the second substrate 12, most of the circuit elements 21 are mounted on the first substrate 11, and this is a cause of increasing a planar size of the first substrate 11. However, according to the optical module 100 of the present embodiment, the first substrate 11 and the second substrate 12 are joined to each other via the first support portion 16, and thereby, the gap S1 in which the circuit element 21 is mountable can be provided between the first substrate 11 and the second substrate 12. Thereby, the circuit element 21 mounted on the first substrate 11 in the related art is mountable in the gap S1 between the first substrate 11 and the second substrate 12, and thus, the planar size of the first substrate 11 can be reduced. Accordingly, the planar size of the optical module 100 can be reduced (narrowed).

According to the optical module 100 of the present embodiment, the circuit element 21 of a circuit that easily generates an electrical noise, such as the booster circuit 5a, is mounted on the first substrate 11, and the circuit element 21 of a circuit that is susceptible to the electrical noise, such as the capacitance voltage conversion circuit 6a, is mounted on the second substrate 12. With this configuration, the circuit that easily generates the electrical noise and the circuit that is susceptible to the electrical noise are separately mounted on the first substrate 11 and the second substrate 12, and thus, the influence of the electrical noise can be reduced.

Second Embodiment

Figure 6:
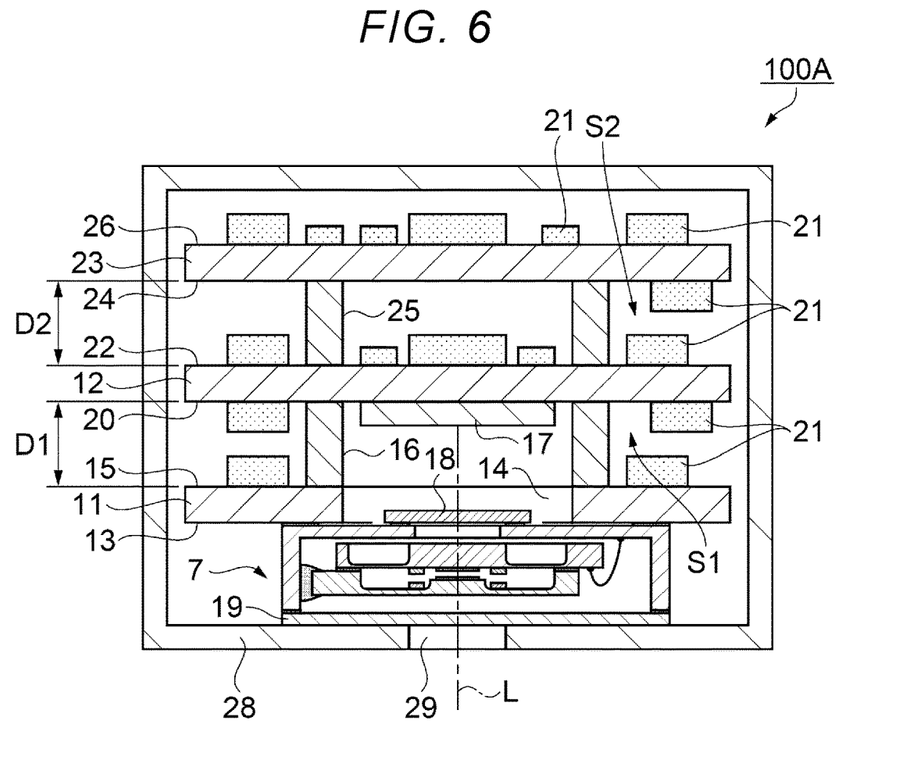
FIG. 6 is a sectional diagram illustrating a schematic configuration of an optical module according to a second embodiment.

FIG. 6 is a sectional diagram illustrating a schematic configuration of an optical module 100A according to a second embodiment.

In the first embodiment described above, an example is illustrated in which two circuit substrates (the first substrate 11 and the second substrate 12) are mounted via the first support portion 16, and the circuit element 21 is mounted in the gap S1 between the substrates. In contrast to this, the present embodiment is different from the first embodiment in that the number of circuit substrates is not limited to two and at least three circuit substrates are mounted via a support portion.

In FIG. 6, the same reference numerals are assigned to the same configurations as in the first embodiment. Further, the optical module 100A according to the present embodiment is configured in the same manner as the block diagram (see FIG. 1) of the optical module 100 according to the first embodiment. Further, a configuration of the optical filter device 7 (see FIG. 2) configuring the optical module 100A according to the present embodiment is the same as the configuration according to the first embodiment. Therefore, description on the same configuration portion is omitted.

As illustrated in FIG. 6, three circuit substrates are used in the present embodiment. The three circuit substrates are referred to as the first substrate 11, the second substrate 12, and a third substrate 23. Further, among surface portions on both sides of the third substrate 23, one surface portion is referred to as a fifth planar portion 24 and the other surface portion is referred to as a sixth planar portion 26. It is assumed that the fourth planar portion 22 of the second substrate 12 and the fifth planar portion 24 of the third substrate 23 face each other.

In the present embodiment, the first substrate 11 and the second substrate 12 are joined to each other via the first support portion 16 in the same manner as the first embodiment. Further, the second substrate 12 and the third substrate 23 are joined to each other via the second support portion 25. In other words, the fourth planar portion 22 of the second substrate 12 and the fifth planar portion 24 of the third substrate 23 are joined to each other via the second support portion 25. In detail, the third substrate 23 is joined to the fourth planar portion 22 of the second substrate 12 via the second support portion 25.

At this time, it is desirable that the second substrate 12 and the third substrate 23 be electrically joined to each other in at least one location of the second support portion 25. When the second substrate 12 and the third substrate 23 are mechanically joined and are not electrically joined, the second substrate and the third substrate may be electrically joined to each other by using a conductive material such as a bonding wire or an FFC.

Further, as illustrated in FIG. 6, the second support portion 25 according to the present embodiment has a gap S2 between the second substrate 12 and the third substrate 23. A distance in a height direction (direction parallel to the optical axis L) of the gap S2 is determined by a thickness D2 of the second support portion 25. By making the thickness D2 of the second support portion 25 larger than thicknesses of the circuit elements 21 mounted on the second substrate 12 and the third substrate 23, the circuit elements 21 can be mounted on the fourth planar portion 22 and the fifth planar portion 24, respectively. Further, the circuit element 21 is also mountable on the sixth planar portion 26 of the third substrate 23.

As described above, according to the optical module 100A of the present embodiment, the following effects can be obtained in addition to the same effects as in the first embodiment.

According to the optical module 100A of the present embodiment, in addition to the first substrate 11 and the second substrate 12, the third substrate 23 is further provided, and the second substrate 12 and the third substrate 23 are joined to each other by the second support portion 25 with the gap S2 in which the circuit element 21 is mountable. Further, the second support portion 25 mechanically or electrically joins the second substrate 12 and the third substrate 23 to each other. With this configuration, an area where the circuit element 21 is mountable is further increased, and a planar size of the first substrate 11 can be further reduced.

Third Embodiment

Figure 7:
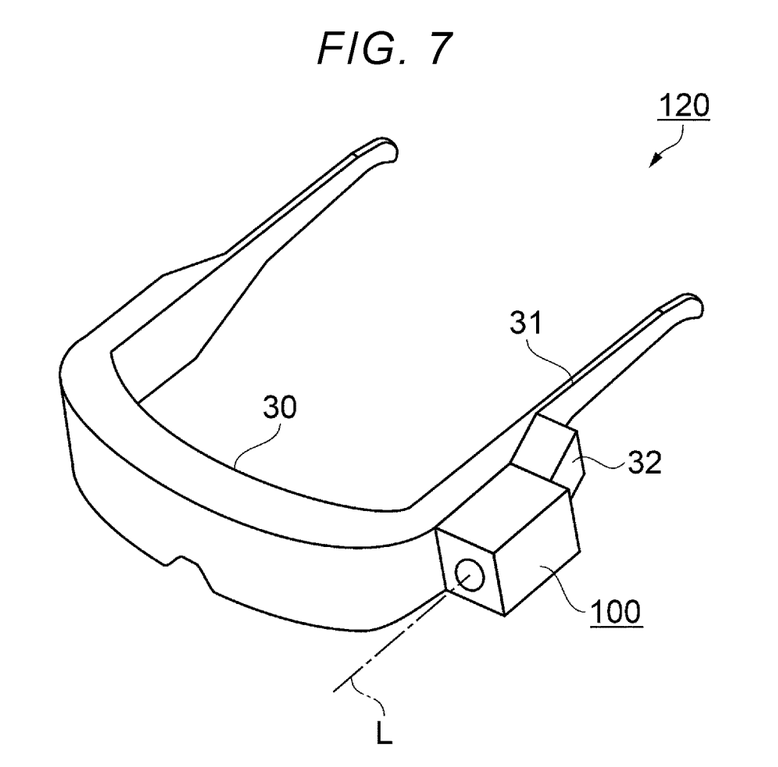
FIG. 7 is a schematic perspective diagram illustrating an electronic apparatus according to a third embodiment.

FIG. 7 is a schematic perspective diagram illustrating an electronic apparatus according to a third embodiment.

In the present embodiment, a head mounted display 120 is illustrated as an example of the electronic apparatus.

The head mounted display 120 is mounted with the optical modules 100 and 100A according to the first and second embodiments. In the present embodiment, the optical modules 100 and 100A are mounted on a frame 30 of the head mounted display 120, particularly on aside surface region of a temple 31. The head mounted display 120 is mounted with an optical module control unit 32 for controlling the optical modules 100 and 100A, and the optical modules 100 and 100A perform a spectroscopic measurement based on a command from the optical module control unit 32.

As described above, according to the electronic apparatus (head mounted display 120) of the present embodiment, the following effects can be obtained.

According to the head mounted display 120 of the present embodiment, by including the optical modules 100 and 100A in the first and second embodiments, when viewed from a front direction of the head mounted display 120, planar sizes of the optical modules 100 and 100A can be reduced. Thereby, it is possible to increase a degree of freedom of a design of the head mounted display 120.

The present disclosure is not limited to the above-described embodiments, and various modifications and improvements can be added to the above-described embodiments. The modification example will be described below.

Modification Example 1

In the first embodiment, a distance of the gap S1 in a height direction is determined by the thickness D1 of the first support portion 16 and is larger than thicknesses of the circuit element 21 mounted on the first substrate 11 and the second substrate 12, and the circuit elements 21 are mounted on each of the second planar portion 15 and the third planar portion 20. However, the present disclosure is not limited to this, and the circuit element 21 may be mounted on one of the second planar portion 15 and the third planar portion 20. In that case, the thickness D1 of the first support portion 16 may be larger than the thickness of the circuit element 21 mounted on any one of the planar portions. This also applies to the thickness D1 of the first support portion 16 and the thickness D2 of the second support portion 25 in the second embodiment.

Modification Example 2

In the third embodiment, the head mounted display 120 is illustrated as an example of an electronic apparatus to which the optical modules 100 and 100A are applied. However, the present disclosure is not limited to this and can also be applied to an electronic apparatus such as a projector or a printer that requires reduction of a planar size rather than a depth size.

Content derived from the above-described embodiments is described below.

The optical module includes a first substrate including an optical filter device having a wavelength variable interference filter built therein, a second substrate including a light receiving element, and a first support portion that mechanically or electrically joins the first substrate and the second substrate to each other, in which the wavelength variable interference filter and the light receiving element are disposed to face each other by the first support portion, and the first substrate and the second substrate are joined to each other by the first support portion with a gap in which a circuit element is mountable.

According to this configuration, a wavelength variable interference filter and a light receiving element are disposed to face each other by a first support portion and a first substrate, and thereby, the light receiving element can reliably receive light emitted from the optical filter device. Further, in the related art, a circuit element is not mounted between the first substrate and the second substrate, and most circuit elements are mounted on the first substrate, which causes an increase in a planar size of the first substrate. However, the first substrate and the second substrate are joined to each other through a gap in which the circuit element is mountable, and thereby, the circuit element on the first substrate can be mounted in the gap between the first substrate and the second substrate, and thus, a planar size of the first substrate can be reduced. Accordingly, it is possible to reduce (narrow) a planar size of an optical module.

It is preferable that the optical module includes a third substrate, and a second support portion that mechanically or electrically joins the second substrate and the third substrate to each other, in which the second substrate and the third substrate are joined to each other by the second support portion with a gap in which a circuit element is mountable.

According to this configuration, a third substrate is further provided, and a second support portion that mechanically or electrically joins the second substrate and the third substrate to each other is provided between the second substrate and the third substrate in a state of joining through a gap in which a circuit element is mountable, and thereby, it is possible to further increase an area of a substrate on which the circuit element is mountable, and to further reduce a planar size of a first substrate.

In the optical module, it is preferable that the second substrate includes a capacitance voltage conversion circuit.

According to this configuration, for example, a capacitance voltage conversion circuit included in an optical filter device signal processing unit is a circuit that converts a capacitance of an optical filter device into a voltage and is a circuit that is susceptible to electrical noise. Further, for example, a booster circuit included in an optical filter device driving unit is a circuit that boosts a power supply voltage to a voltage that can drive a wavelength variable interference filter and is a circuit that easily generates the electrical noise. In the related art, the capacitance voltage conversion circuit is mounted on a first substrate. In the same manner as in the related art, by operating the booster circuit mounted on the first substrate, a noise is easily generated in the capacitance voltage conversion circuit. However, by providing, on the first substrate, a circuit easily generating the electrical noise such as the booster circuit and by providing, on the second substrate, a circuit that is susceptible to the electrical noise such as the capacitance voltage conversion circuit, it is possible to reduce an influence of the noise.

Further, by reducing the influence of the noise of the capacitance voltage conversion circuit, the optical filter device signal processing unit can acquire the capacitance of the optical filter device with a higher accuracy. If the accuracy of acquiring the capacitance of the optical filter device is increased, an accuracy of a wavelength control of light transmitting the wavelength variable interference filter is increased. Accordingly, it is possible to measure a spectrum of a target measurement object with a higher accuracy.

An electronic apparatus includes any one of the optical modules described above and a control unit that controls the optical module.

According to this configuration, the electronic apparatus includes an optical module and a control unit that controls the optical module, and thus, a planar size of the optical module can be reduced and a degree of freedom in design can be improved.

What is claimed is:

1. An optical module comprising:
   a first substrate including an optical filter device having a wavelength variable interference filter built therein;
   a second substrate including a light receiving element; and
   a first supporter that mechanically or electrically joins the first substrate and the second substrate to each other, wherein:
   the wavelength variable interference filter and the light receiving element are disposed to face each other by the first supporter,
   the first substrate and the second substrate are joined to each other by the first supporter with a gap in which a circuit element is mountable,
   the first supporter includes at least two supports;
   the light receiving element is located between the first substrate and the second substrate in an internal gap between the at least two supports; and
   the circuit element is located between the first substrate and the second substrate in an external gap outside of the at least two supports.

2. The optical module according to claim 1, further comprising:
   a third substrate; and
   a second supporter that mechanically or electrically joins the second substrate and the third substrate to each other, wherein
   the second substrate and the third substrate are joined to each other by the second supporter with a gap in which a circuit element is mountable.

3. The optical module according to claim 1, wherein the second substrate includes a capacitance voltage conversion circuit.

4. An electronic apparatus comprising:
   the optical module according to claim 1; and
   a control unit that controls the optical module.

5. The optical module according to claim 1, wherein the circuit element includes a booster circuit mounted on the first substrate and a capacitance voltage conversion circuit that is mounted on the second substrate.

* * * * *